United States Patent
Czarnecki

(10) Patent No.: US 11,091,641 B2
(45) Date of Patent: *Aug. 17, 2021

(54) LIQUID COMPOSITE EMULSIONS

(71) Applicant: Micro Powders, Inc., Tarrytown, NY (US)

(72) Inventor: Richard John Czarnecki, Tarrytown, NY (US)

(73) Assignee: Micro Powders, Inc., Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,529

(22) Filed: Apr. 10, 2020

(65) Prior Publication Data

US 2020/0325338 A1    Oct. 15, 2020

Related U.S. Application Data

(63) Continuation-in-part of application No. 16/379,220, filed on Apr. 9, 2019, now Pat. No. 10,646,412.

(51) Int. Cl.
*C08K 3/22* (2006.01)
*C08L 91/06* (2006.01)

(52) U.S. Cl.
CPC .............. *C08L 91/06* (2013.01); *C08K 3/22* (2013.01); *C08K 2003/2227* (2013.01); *C08K 2201/005* (2013.01); *C08K 2201/011* (2013.01); *C08L 2201/52* (2013.01)

(58) Field of Classification Search
CPC ....................................................... C08K 3/22
See application file for complete search history.

(56) References Cited

U.S. PATENT DOCUMENTS

| | | |
|---|---|---|
| 5,028,417 A | 7/1991 | Bhat et al. |
| 5,188,831 A | 2/1993 | Nicoll |
| 5,340,567 A | 8/1994 | Cole et al. |
| 5,498,406 A | 3/1996 | Nearn et al. |
| 7,384,697 B2 | 6/2008 | Chen et al. |
| 7,582,147 B1 | 9/2009 | Parker et al. |
| 2006/0171870 A1 | 8/2006 | Qi et al. |
| 2013/0177616 A1 | 7/2013 | Marim de Olivera et al. |
| 2016/0053398 A1 | 2/2016 | Kurtz et al. |

FOREIGN PATENT DOCUMENTS

| | | | |
|---|---|---|---|
| DE | 3642794 A1 | 6/1987 | |
| EP | 0535972 A1 | 4/1993 | |
| EP | 0619999 A2 | 10/1994 | |
| EP | 0628303 A1 | 12/1994 | |
| EP | 0752922 A1 | 1/1997 | |
| JP | S5862106 A | 4/1983 | |
| JP | 6233219 B2 | 2/2016 | |
| KR | 101648676 B1 * | 8/2016 | ............... A61Q 1/00 |
| KR | 101648676 B1 | 8/2016 | |
| WO | 9006103 A1 | 6/1990 | |

(Continued)

OTHER PUBLICATIONS

U.S. Office Action U.S. Appl. No. 16/379,220 dated Jun. 28, 2019 7 Pages.

*Primary Examiner* — Benjamin J Packard
(74) *Attorney, Agent, or Firm* — Whitmyer IP Group LLC

(57) ABSTRACT

A solvent-free composite emulsion including at least one thermoplastic material and at least one submicron nanoparticle material.

19 Claims, 2 Drawing Sheets

(56) References Cited

FOREIGN PATENT DOCUMENTS

| WO | 9311742 | A1 | 6/1993 |
|----|---------|----|--------|
| WO | 9641614 | A1 | 12/1996 |
| WO | 9703776 |    | 2/1997 |
| WO | 9707069 | A1 | 2/1997 |
| WO | 2013040636 | A1 | 3/2013 |
| WO | 2015090622 | A1 | 6/2015 |
| WO | 2016013975 | A1 | 1/2016 |

\* cited by examiner

LIQUID COMPOSITE EMULSIONS

TECHNICAL FIELD

The present invention relates generally to liquid composite emulsions. More specifically, the present invention relates to liquid emulsions containing thermoplastic materials and submicron particles and the method to produce those composites.

BACKGROUND

Micronized wax additives have been used to modify coatings for decades. They can provide a wide range of properties, including surface protection, gloss reduction, water repellency, and texturizing. These additives are typically based on low molecular weight polymeric materials, including polyethylene, polypropylene, carnauba wax, and other synthetic and natural materials. Micronized wax additives can also be used in cosmetics and personal care products, providing properties that include dry binding, thickening, mattifying, and texturizing. Micronized wax additives can also be provided in the form of aqueous wax emulsions, where the wax particles are extremely small, typically below 1.0 micron in size. Emulsions are especially useful for applications where a smaller particle is beneficial. This would include applications where a high gloss coating is desirable. They are also useful in digital and inkjet printing, where the particle size of any solid material in the liquid coating is constrained by the dimensions of the digital printing head.

Recent years have witnessed unprecedented growth of research and applications in the area of nanoscience and nanotechnology. Recent leaps in areas such as microscopy have given scientists new tools to understand and take advantage of phenomena that occur naturally when matter is organized at the nanoscale. In essence, these phenomena are based on "quantum effects" and other physical effects such as expanded surface area. In addition, a majority of biological processes occur at the nanoscale which gives scientists models and templates to imagine and construct new processes that can enhance their work in medicine, imaging, computing, printing, chemical catalysis, materials synthesis, and many other fields. Nanotechnology is not simply working at ever smaller dimensions; rather, working at the nanoscale enables scientists to utilize unique physical, chemical, mechanical, and optical properties of materials. In particular, metal nanoparticles exhibit interesting electronic magnetic and catalytic properties that are not present in the bulk metal. These materials offer exciting opportunities to develop smarter, more functional additives.

During the last few years, research on toxicologically relevant properties of engineered nanoparticles has increased tremendously. A number of international research projects and additional activities are ongoing in the EU and the US, nourishing the expectation that more relevant technical and toxicological data will be published. Their widespread use allows for potential exposure to engineered nanoparticles during the whole lifecycle of a variety of products. When looking at possible exposure routes for manufactured nanoparticles, inhalation, dermal and oral exposure are the most obvious, depending on the type or product in which nanoparticles are used. Studies show that nanoparticles can deposit in the respiratory tract after inhalation. For a number of nanoparticles, oxidative stress-related inflammatory reactions have been observed. Tumor-related effects have only been observed in rats, and might be related to overload conditions.

There are also a few reports that indicate uptake of nanoparticles in the brain via the olfactory epithelium. Nanoparticle translocation into the systemic circulation may occur after inhalation but conflicting evidence is present on the extent of translocation. These findings urge the need for additional studies to further elucidate these findings and to characterize the physiological impact. There is currently little evidence from skin penetration studies that dermal applications of metal oxide nanoparticles used in sunscreens lead to systemic exposure. However, the question has been raised whether the usual testing with healthy, intact skin will be sufficient. Uptake of nanoparticles in the gastrointestinal tract after oral uptake is a known phenomenon, of which use is intentionally made in the design of food and pharmacological components.

Only a few specific nanoparticles have been investigated in a limited number of test systems and extrapolation of this data to other materials is not possible. Air pollution studies have generated indirect evidence for the role of combustion derived nanoparticles (CDNP) in driving adverse health effects in susceptible groups. Experimental studies with some bulk nanoparticles (carbon black, titanium dioxide, iron oxides) that have been used for decades suggest various adverse effects. However, engineered nanomaterials with new chemical and physical properties are being produced constantly and the toxicity of these is unknown. Therefore, despite the existing database on nanoparticles, no blanket statements about human toxicity can be given at this time. In addition, limited eco-toxicological data for nanomaterials precludes a systematic assessment of the impact of nanoparticles on ecosystems.

When particle sizes of solid matter in the visible scale are compared to what can be seen in a regular optical microscope, there is little difference in the properties of the particles. But when particles are created with submicron dimensions (especially in the range of 1-100 nanometers where the particles can be "seen" only with powerful specialized microscopes), the materials' properties change significantly from those at larger scales. This is the size of scale where so-called quantum effects rule the behavior and properties of particles. Properties of materials are size-dependent in this scale range. Thus, when particle size is made to be nanoscale, properties such as melting point, fluorescence, electrical conductivity, magnetic permeability, and chemical reactivity change as a function of the size of the particle.

Many benefits of nanotechnology depend on the fact that it is possible to tailor the structures of materials at extremely small scales to achieve specific properties, thus greatly extending the materials science toolkit. Using nanotechnology, materials can effectively be made stronger, lighter, more durable, more reactive, more sieve-like, or better electrical conductors, among many other traits. Many everyday commercial products are currently on the market and in daily use that rely on nanoscale materials and processes.

Nanoscale additives to or surface treatments of fabrics can provide lightweight ballistic energy deflection in personal body armor, or can help them resist wrinkling, staining, and bacterial growth.

Clear nanoscale films on eyeglasses, computer and camera displays, windows, and other surfaces can make them water- and residue-repellent, antireflective, self-cleaning, resistant to ultraviolet or infrared light, anti-fog, antimicrobial, scratch-resistant, or electrically conductive.

Nanoscale materials are beginning to enable washable, durable "smart fabrics" equipped with flexible nanoscale sensors and electronics with capabilities for health monitoring, solar energy capture, and energy harvesting through movement.

Nano-bioengineering of enzymes as aiming to enable conversion of cellulose from wood chips, corn stalks, unfertilized perennial grasses, etc., into ethanol for fuel. Cellulosic nanomaterials have demonstrated potential applications in a wide array of industrial sectors, including electronics, construction, packaging, food, energy, health care, automotive, and defense. Cellulosic nanomaterials are projected to be less expensive than many other nanomaterials and, among other characteristics, tout an impressive strength-to-weight ratio.

Nano-engineered materials in automotive products include high-power rechargeable battery systems, thermoelectric materials for temperature control, tires with lower rolling resistance, high-efficiency/low-cost sensors and electronics, thin-film smart solar panels, and fuel additives for cleaner exhaust and extended range.

Nanostructured ceramic coatings exhibit much greater toughness than conventional wear-resistant coatings for machine parts. Nanotechnology-enabled lubricants and engine oils also significantly reduce wear and tear, which can significantly extend the lifetimes of moving parts in everything from power tools to industrial machinery.

Nanoparticles are used increasingly in catalysis to boost chemical reactions. This reduces the quantity of catalytic materials necessary to produce desired results, saving money and reducing pollutants. Two big applications are in petroleum refining and in automotive catalytic converters.

Nano-engineered materials make superior household products such as degreasers and stain removers, environmental sensors, air purifiers, and filters, antibacterial cleansers, and specialized paints and sealing products, such a self-cleaning house paints that resist dirt and marks.

Nanoscale materials are also being incorporated into a variety of personal care products to improve performance. Nanoscale titanium dioxide and zinc oxide have been used for years in sunscreen to provide protection from the sun while appearing invisible on the skin.

It is evident from these many examples that the power of nanoscale materials presents many opportunities to create innovative products. The challenge is to harness the power of the nanoparticle in such a way that the shortcomings of these novel materials are avoided.

Nanoparticles, having an extremely high surface areas, are very difficult to disperse or otherwise incorporate into a liquid system, whether it's water based, solvent based, oil based, or other. Nanoparticles are difficult to handle in both laboratory and industrial processes, as they can create fine clouds of dust when conveyed, dispensed, or otherwise incorporated into a product. Nanoparticles are still not fully understood with regards to potential risks to human health on exposure including, but not limited to inhalation and skin absorption. Nanoparticles can abrade, wear, or otherwise degrade manufacturing, processing, and filling equipment.

Submicron particles (including nanoparticles) can be classified into different types according to the size, morphology, physical and chemical properties. Some of them are carbon-based particles, ceramic particles, metal particles, semiconductor particles, and polymeric particles.

Carbon-based nanoparticles include two main materials: carbon nanotubes (CNTs) and fullerenes. CNTs are nothing but graphene sheets rolled into a tube. These materials are mainly used for the structural reinforcement as they are 100 times stronger than steel. CNTs can be classified into single-walled carbon nanotubes (SWCNTs) and multi-walled carbon nanotubes (MWCNTs). CNTs are unique in a way as they are thermally conductive along the length and non-conductive across the tube. Fullerenes are the allotropes of carbon having a structure of hollow cage of sixty or more carbon atoms. The structure of C-60 is called Buckminsterfullerene, and looks like a hollow football. The carbon units in these structures have a pentagonal and hexagonal arrangement. These have commercial applications due to their electrical conductivity, structure, high strength, and electron affinity. Graphene particles are known to provide benefits that include corrosion resistance and electrostatic dissipation (ESD).

Ceramic particles are inorganic solids made up of oxides, carbides, carbonates and phosphates. These submicron particles and/or nanoparticles have high heat resistance and chemical inertness. They have applications in photocatalysis, photodegradation of dyes, drug delivery, and imaging. By controlling some of the characteristics of ceramic nanoparticles like size, surface area, porosity, surface to volume ratio, etc., they perform as a good drug delivery agent. These nanoparticles have been used effectively as a drug delivery system for a number of diseases like bacterial infections, glaucoma, cancer, etc.

Metal particles are prepared from metal precursors. These submicron particles and/or nanoparticles can be synthesized by chemical, electrochemical, or photochemical methods. Metal nanoparticles, such as aluminum oxide, are also highly effective at improving surface durability properties (scratch resistance, abrasion resistance, etc.) in coatings.

Inorganic particles can include titanium dioxide submicron and/or nanoparticles, which can impart a self-cleaning effect to glass and solid exterior surfaces. Zinc oxide particles have been found to have superior UV blocking properties compared to its bulk substitute.

Semiconductor nanoparticles have properties like those of metals and non-metals. They are found in the periodic table in groups II-VI, III-V, or IV-VI. These particles have wide bandgaps, which on tuning shows different properties. They are used in photocatalysis, electronics devices, photo-optics and water splitting applications. Some examples of semiconductor nanoparticles are GaN, GaP, InP from group III-V, ZnO, ZnS, CdS, CdSe, CdTe are II-VI semiconductors and silicon and germanium are from group IV.

Polymeric submicron and/or nanoparticles are organic based particles. Depending upon the method of preparation, these can have structures shaped like nanocapsular or nanospheres. A nanosphere particle has a matrix-like structure whereas the nanocapsular particle has core-shell morphology. In the former, the active compounds and the polymer are uniformly dispersed whereas in the latter the active compounds are confined and are surrounded by a polymer shell. Some of the merits of polymeric nanoparticles are controlled release, protection of drug molecules, ability to combine therapy and imaging, specific targeting and many more. They have applications in drug delivery and diagnostics. The drug deliveries with polymeric nanoparticles are highly biodegradable and biocompatible.

A limitation of the commercial industrial use of submicron particles is that they are highly difficult to disperse. These powders have very high surface areas, and it is challenging to use these powders in additives without preliminary processing. This could include chemical surface modification, to stabilize the particle in a liquid media, and wet phase agitation bead milling, to separate, wet, and disperse the powder into its primary particle size. When wet processing is used, the choice of processing media limits the versatility of the modified powder.

Therefore, it would be desirable to find a way to deliver the performance of these submicron particles in a composite emulsion particle matrix without the use of a solvent, using common emulsification technology. It would be further desirable to develop a composition containing submicron particles that are safe to handle.

SUMMARY

The needs set forth herein as well as further and other needs and advantages are addressed by the present embodiments, which illustrate solutions and advantages described below.

The present inventor has discovered that the inherent performance features of the submicron particles are maintain when incorporated into a thermoplastic emulsion composite.

The present inventor has also discovered that these thermoplastic composites are significantly easier to disperse into all types of systems, including, but not limited to, industrial coatings (water-based, solvent-based, and UV curable), cosmetics, and personal care products.

The present inventor has also discovered novel methods for incorporating submicron particles into thermoplastic emulsion particles. A benefit of this approach versus prior art is that no solvents are used in the process. Residual solvents can limit the use of the particle in sensitive applications that include food packaging and personal care products.

An additional benefit of the invention is that the potential health and safety concerns with the handling, breathing, ingesting, or touching submicron and/or nanoparticles is avoided with a submicron thermoplastic liquid composite emulsion.

A further benefit of the invention is that the submicron thermoplastic liquid composite emulsion demonstrates a reduction tendency to degrade processing equipment and machinery. Many submicron powders are extremely hard and durable and can damage steel and other processing surfaces. When combined in a composite emulsion with a lubricating thermoplastic material, this abrasive effect is reduced.

The emulsion of one embodiment, according to the present teaching, includes composite particles, and said composite particles comprise at least one thermoplastic material and at least one submicron nanoparticle material. The at least one thermoplastic material comprises from about 50 to 99 weight percent of said composite particle. The at least one submicron nanoparticle material comprises from about 1 to 50 weight percent of said composite particle. The emulsion is solvent-free.

In a further embodiment, the at least one thermoplastic material is a polymer, plastic, or wax, which can be melted and reformed.

In a further embodiment, the at least one submicron nanoparticle material is a nano-aluminum oxide, nano-titanium oxide, or a nano-graphene oxide.

In a further embodiment, the at least one submicron particle has a mean particle size below 1,000 nm.

In a further embodiment, the composite particles have a maximum particle size below 50 microns.

In a further embodiment, the composite particles have a mean particle size ranging from 0.01 to 10 microns.

The liquid composite emulsion of another embodiment, according to the present teaching, includes, but is not limited to, at least one thermoplastic material and at least one submicron particle, wherein the liquid composite emulsion is solvent free.

In a further embodiment, the composite particles have a maximum particle size below 50 microns.

In a further embodiment, the composite particles have a mean particle size ranging from 0.01 to 10 microns.

In a further embodiment, the at least one submicron particle has a mean particle size below 1,000 nm.

In a further embodiment, the at least one thermoplastic material is a polymer, plastic, or wax which can be melted down and reformed.

In a further embodiment, the at least one submicron particle is nano aluminum oxide.

In a further embodiment, the liquid composite emulsion with the nano aluminum oxide submicron particle is used as a coating additive to improve surface durability.

In a further embodiment, the at least one submicron particle is nano titanium oxide.

In a further embodiment, the liquid composite emulsion with the nano titanium oxide submicron particle is used as an additive in personal care products to improve SPF protection.

In a further embodiment, the at least one submicron particle is graphene oxide.

In a further embodiment, the liquid composite emulsion with the graphene oxide submicron particle is used as an additive to improve corrosion resistance in a surface coating.

In a further embodiment, the liquid composite emulsion with the graphene oxide submicron particle is used as an additive to improve electrostatic dissipation in a surface coating.

The liquid composite emulsion of another embodiment, according to the present teaching, include composite particles, and said composite particles comprise at least one thermoplastic material and at least on submicron nanoparticle material. The at least one thermoplastic material comprises from about 50 to 99 weight percent of said composite particles. The at least one submicron nanoparticle material comprises from about 1 to 50 weight percent of said composite particles. The liquid composite emulsion is solvent-free.

Other embodiments of the system and method are described in detail below and are part of the present teachings.

For a better understanding of the present embodiments, together with other and further aspects thereof, reference is made accompanying drawings and detailed description, and its scope will be pointed out in the appended claims.

DETAILED DESCRIPTION

Figure 1:
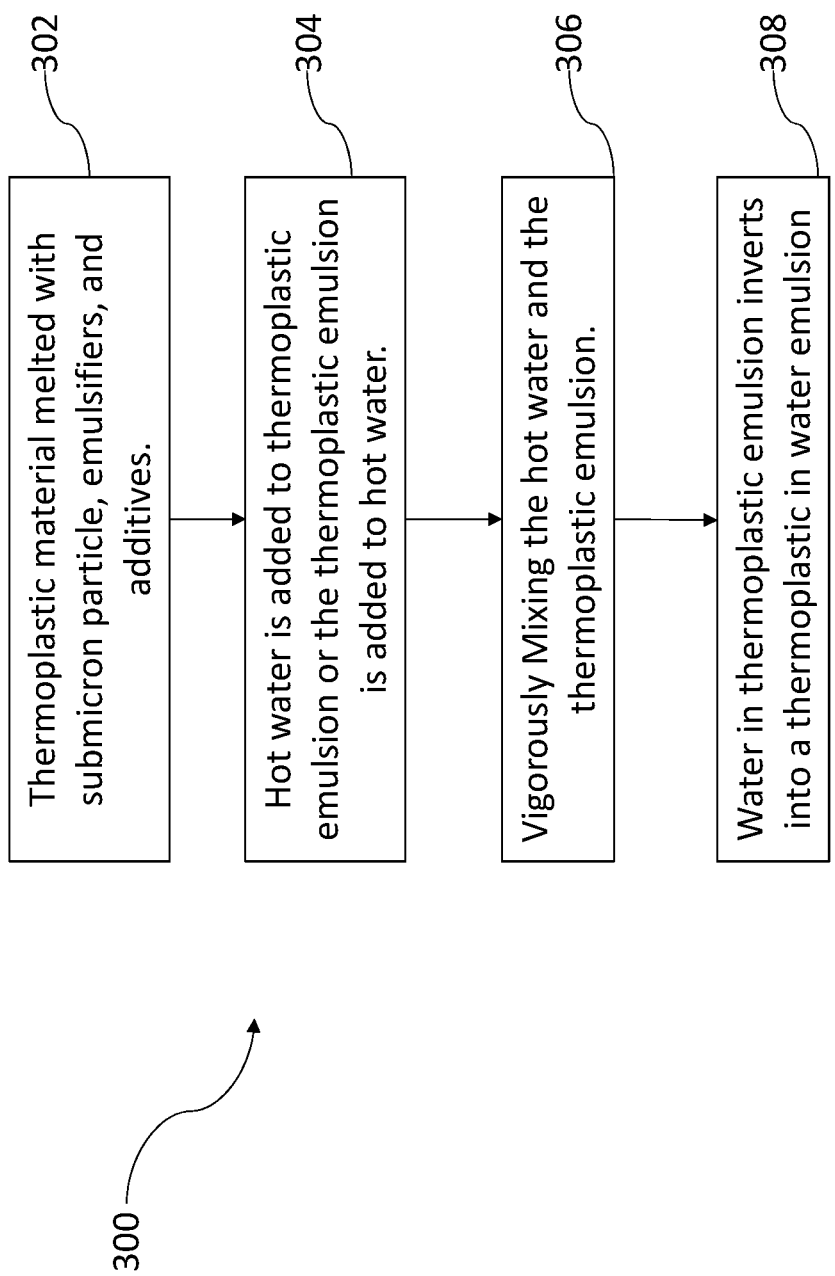
FIG. 1 is a schematic flow diagram illustrating a method of producing the liquid composite emulsion.

The present teachings are described more fully hereinafter with reference to the accompanying drawings, in which the present embodiments are shown. The following description is presented for illustrative purposes only and the present teachings should not be limited to these embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the descriptions with unnecessary detail.

In this invention, "thermoplastic material" is broadly defined as any substance (such as, but not limited to, polymer, plastic, natural wax) that can be melted, liquefied, softened, or otherwise modified such that it can be homogenously combined with the submicron or nanoscale material, into a liquid composite emulsion. Examples include, but are not limited to, polymers including polyethylene, polypropylene, polyamide, polyester, natural waxes such as carnauba wax, and synthetic waxes such as Fischer-Tropsch wax.

In this invention, "submicron nanoparticle material" is defined as a particle with a mean particle size below 1,000 nm. Preferably, the submicron nanoparticle material is below 500 nm. Most preferably, the submicron nanoparticle material is below 100 nm.

In this invention, the composite emulsion particles have a maximum particle size below 50 microns. Preferably, the composite particles in the emulsion have a mean particle size ranging from 0.01 to 10 microns. More preferably, the composite emulsion particles have a mean particle size of 0.01 to 1.0 microns with a maximum particle size of 5 microns. Most preferably, the composite emulsion particles have a mean particle size of 0.01 to 0.5 microns with a maximum particle size of 1 micron.

In this invention, sufficient time is defined as a time long enough to homogenize the submicron nanoparticle material with the thermoplastic material matrix to form a molten composite.

In this invention, sufficient temperature is defined as a temperature high enough to convert the dry mixture into the molten composite.

In this multi-step process, the thermoplastic material is selected to serve as the matrix for the composite particles. This thermoplastic material can then be melted and combined with the submicron nanoparticle material using sufficient energy to wet, separate, and disperse the submicron nanoparticle materials homogenously throughout the thermoplastic material matrix. This thermoplastic composite can then be processed and supplied as an easy to use liquid emulsion.

In another embodiment of this invention, the composite particle can be formed in an emulsion manufacturing process, whereby the thermoplastic and submicron components are combined, melted, and emulsified into particles stabilized in a liquid material. Emulsified particles are typically less than 1 micron in size, and are often much smaller (100-500 nm).

In general, there are three basic methods to manufacture thermoplastic emulsions:

Dispersion of Water into Thermoplastic

FIG. 1 shows, by way of a non-limiting example, one process 300 of forming a liquid composite emulsion. In the first step 302, a thermoplastic material is melted comprising the submicron particles, emulsifiers, and additives. In the second step 304, the water into thermoplastic method comprises the addition of hot water to melted thermoplastic containing one or more submicron components, emulsifiers, and appropriate additives and vigorous mixing is done is step three 306. In step four 308, as more water is added, the water in thermoplastic emulsion inverts into a thermoplastic in water emulsion. The method requires the application of thermoplastics with a low melting point and a relatively low viscosity.

Dispersion of Thermoplastic into Water

Alternatively, FIG. 1 also displays a method of dispersion of thermoplastic into water 300. The thermoplastic into water method comprises the melting of thermoplastic with the addition of one or more submicron particles and one emulsifier 302 and adding the mixture to hot water 304, containing other emulsifiers and additives with vigorous mixing 306. In this method the emulsion may already be a thermoplastic in water emulsion making step 308 redundant or unnecessary. The thermoplastic may be added directly on the surface or inside the water phase via an opening in the shaft of the mixing paddle.

Pressure Emulsification

Figure 2:
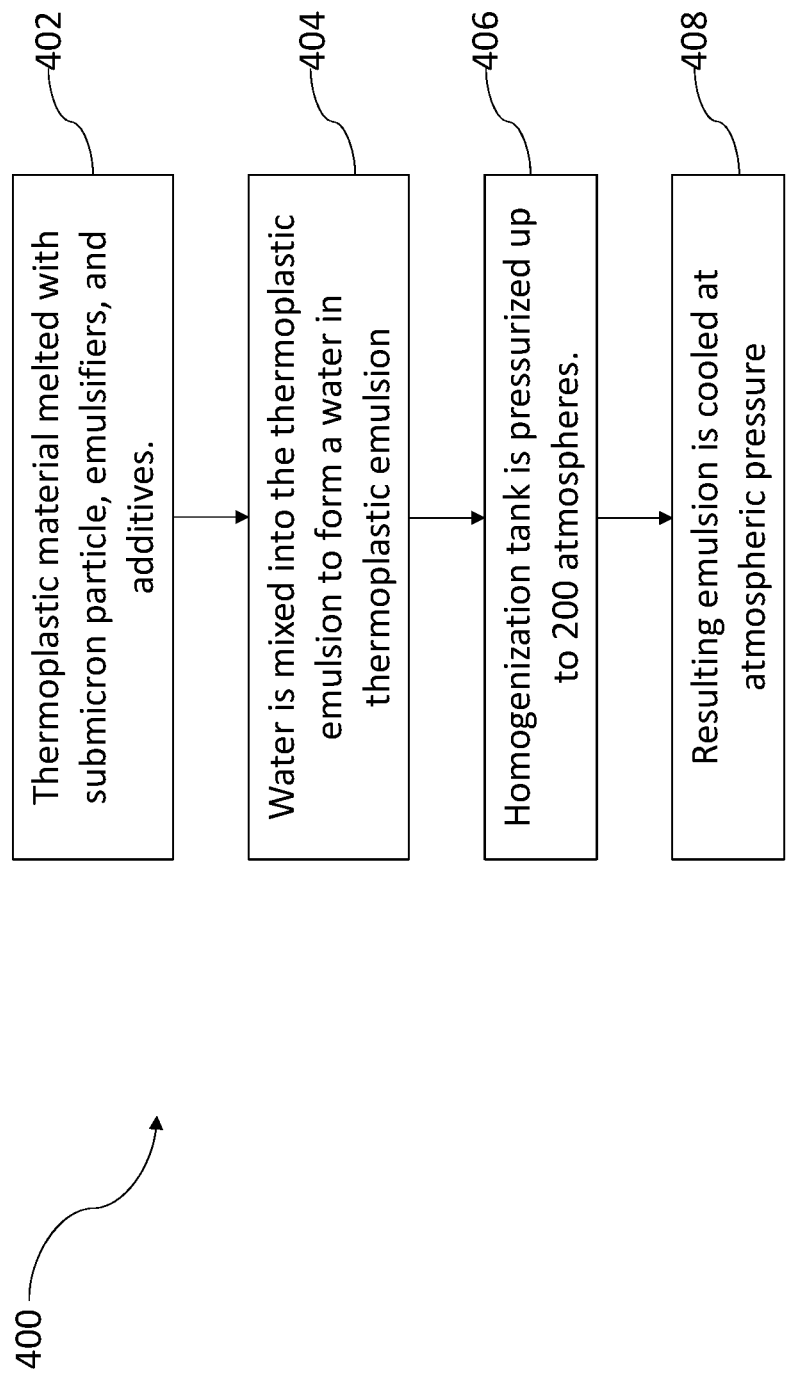
FIG. 2 is a schematic flow diagram illustrating another method of producing the liquid composite emulsion.

FIG. 2 depicts two pressure emulsification techniques 400. The two pressure emulsification techniques 400 are direct and indirect emulsification. The direct method is used to make thermoplastic emulsions using non-ionic surfactants. The method consists of: Step one 402, comprising mixing in a homogenization tank (homogenizer) of all thermoplastics, submicron particles, emulsifiers, additives (anti-foaming and pH regulating agents). Step two 404, comprising adding water at a temperature of 10° C. higher than the melting point of the thermoplastic. Step three 406 is pressurizing the homogenization tank up to 200 atmospheres. In step four 408, the thermoplastic emulsion is then rapidly cooled at atmospheric pressure using an effective external heat exchanger.

The indirect method is used for all types of thermoplastic emulsions, and in particular for thermoplastic emulsions made using anionic and cationic surfactants. The method consists of the formation of an initial thermoplastic emulsion containing all the thermoplastic components, submicron particles, surfactants and additives and part of the water. The remainder of the water is injected in controlled batches at a temperature of less than 100° C. This results in the inversion of a water in thermoplastic emulsion into a thermoplastic in water emulsion. The thermoplastic emulsion is then rapidly cooled under atmospheric pressure using an effective external heat exchanger. In the indirect method it may not be necessary to pressurize the homogenization tank to the extent done in the direct method.

Example 1

Aluminum Oxide/Carnauba Wax Emulsion.

Carnauba wax and fumed aluminum oxide are melted together, followed by the addition of a suitable stabilizing surfactant. Hot water is then added to the melted thermoplastic mixture with vigorous mixing.

As more water is added, the water in thermoplastic emulsion inverts into a thermoplastic in water emulsion.

In the example the thermoplastic composite emulsion material can be produced using various methods.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A liquid emulsion comprising:
    homogenous composite submicron particles comprising a thermoplastic material and a submicron nanoparticle material;
    wherein said thermoplastic material comprises 50 to 99 weight percent of said homogenous composite submicron particles;
    wherein said submicron nanoparticle material comprises 1 to 50 weight percent of said homogenous composite submicron particles; and
    wherein the liquid emulsion is solvent-free.

2. The liquid emulsion of claim 1, wherein the thermoplastic material is a polymer, plastic, or wax, which can be melted and reformed.

3. The liquid emulsion of claim 2, wherein said submicron nanoparticle material is a nano-aluminum oxide, nano-titanium oxide, or nano-graphene oxide.

4. The liquid emulsion of claim 1, wherein said submicron nanoparticle material has a mean particle size less than 1,000 nanometers.

5. The liquid emulsion of claim 1, wherein the homogenous composite submicron particles have a mean particle size ranging from 0.01-1.0 microns.

6. A method of creating a liquid emulsion of homogenous composite particles comprising a thermoplastic material and a submicron nanoparticle material comprising the steps of:
    providing a thermoplastic emulsion comprising a melted thermoplastic material, a submicron nanoparticle material, and an emulsifier;
    adding hot water to the thermoplastic emulsion or adding the thermoplastic emulsion to hot water;
    vigorously mixing the hot water and the thermoplastic emulsion; and
    wherein said thermoplastic material dispersed as emulsion particles in water comprises 50 to 99 weight percent of said emulsion particle and said submicron nanoparticle material comprises 1 to 50 weight percent of said emulsion particle.

7. The method of claim 6, wherein the thermoplastic material is a polymer, plastic, or wax, which can be melted and reformed.

8. The method of claim 7, wherein said submicron nanoparticle material is a nano-aluminum oxide, nano-titanium oxide, or nano-graphene oxide.

9. The method of claim 6, wherein said submicron nanoparticle material has a mean particle size less than 1,000 nanometers.

10. The method of claim 6, wherein the homogenous composite particles have a maximum particle size below 50 microns.

11. The method of claim 6, wherein the homogenous composite particles have a mean particle size ranging from 0.01-10 microns.

12. A method of creating a liquid emulsion of homogenous composite particles comprising a thermoplastic material and a submicron nanoparticle material comprising the steps of:
    providing a thermoplastic emulsion comprising a melted thermoplastic material, a submicron nanoparticle, an emulsifier, and additives to form a mixture;
    mixing water into the thermoplastic emulsion to form a water in thermoplastic emulsion;
    pressurizing the homogenization tank up to 200 atmospheres;
    rapidly cooling a resulting emulsion at atmospheric pressure;
    wherein said thermoplastic material dispersed as emulsion particles in water comprises 50 to 99 weight percent of said emulsion particle and said submicron nanoparticle material comprises 1 to 50 weight percent of said emulsion particle.

13. The method of claim 12 further comprising the step of heating water to a temperature about 10° C. higher than the melting point of the thermoplastic material before mixing the water into the thermoplastic emulsion;
    wherein the thermoplastic emulsion is provided inside a homogenization tank.

14. The method of claim 13 wherein the additives comprise an anti-foaming agent and a pH regulating agent.

15. The method of claim 14 wherein the homogenization tank is pressured at 100-200 atmospheres.

16. The method of claim 12 further comprising the step of injecting the water into the homogenization tank in controlled batches wherein the water has a temperature less than 100° C.

17. The method of claim 16 further comprising the step of inverting the water in thermoplastic emulsion into a thermoplastic in water emulsion before rapidly cooling the emulsion.

18. The liquid emulsion of claim 1, wherein said submicron nanoparticle material is an adjuvant submicron nanoparticle material for improving internal mechanical properties of the homogenous composite submicron particles.

19. The method of claim 6, wherein said submicron nanoparticle material is an adjuvant submicron nanoparticle material for improving internal mechanical properties of the homogenous composite submicron particles.

* * * * *